(12) United States Patent
Gill

(10) Patent No.: US 6,430,014 B1
(45) Date of Patent: Aug. 6, 2002

(54) PROPERLY BIASED AP PINNED SPIN VALVE SENSOR WITH A METALLIC PINNING LAYER AND NO READ GAP OFFSET

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 09/635,722

(22) Filed: Aug. 9, 2000

(51) Int. Cl.[7] .............................................. G11B 5/39
(52) U.S. Cl. ................. 360/324.12; 29/603.08
(58) Field of Search .................... 360/324.12; 29/603.08

(56) References Cited

U.S. PATENT DOCUMENTS

| | | | |
|---|---|---|---|
| 5,508,867 A | 4/1996 | Cain et al. | 360/113 |
| 5,742,162 A | 4/1998 | Nepela et al. | 324/252 |
| 5,768,071 A | 6/1998 | Lin | 360/113 |
| 6,117,569 A * | 9/2000 | Lin | 360/324.12 |
| 6,195,240 B1 * | 2/2001 | Gill | 360/324.12 |

* cited by examiner

Primary Examiner—A. J. Heinz
(74) Attorney, Agent, or Firm—Ervin F. Johnston

(57) ABSTRACT

A free layer of an AP pinned spin valve sensor can be properly biased when the pinning layer is metallic and no gap offset is provided by counterbalancing a net demagnetizing field $H_D$ and a net sense current field $H_I$ by a ferromagnetic coupling field $H_F$ and a demagnetizing field from a biasing layer $H_B$. The biasing layer is composed of a high resistance material which is preferably cobalt iron niobium (CoFeNb) or cobalt iron niobium hafnium (CoFeNbHf). A thickness of a copper spacer layer is selected so that the ferromagnetic coupling field $H_F$ is either positive or negative, depending upon the direction of the sense current field $I_S$ conducted through the sensor and the thicknesses of first and second AP pinned layers of an AP pinned layer structure are selected so that the net demagnetizing field $H_D$ supports the net sense current field $H_I$.

53 Claims, 10 Drawing Sheets

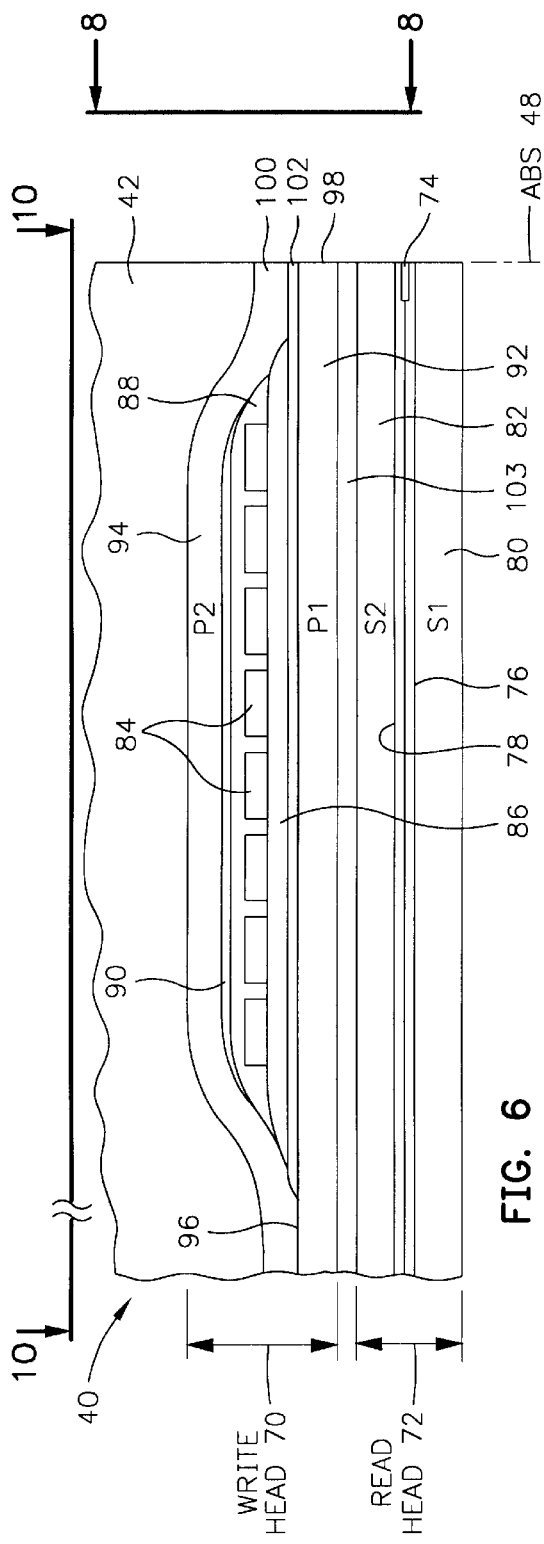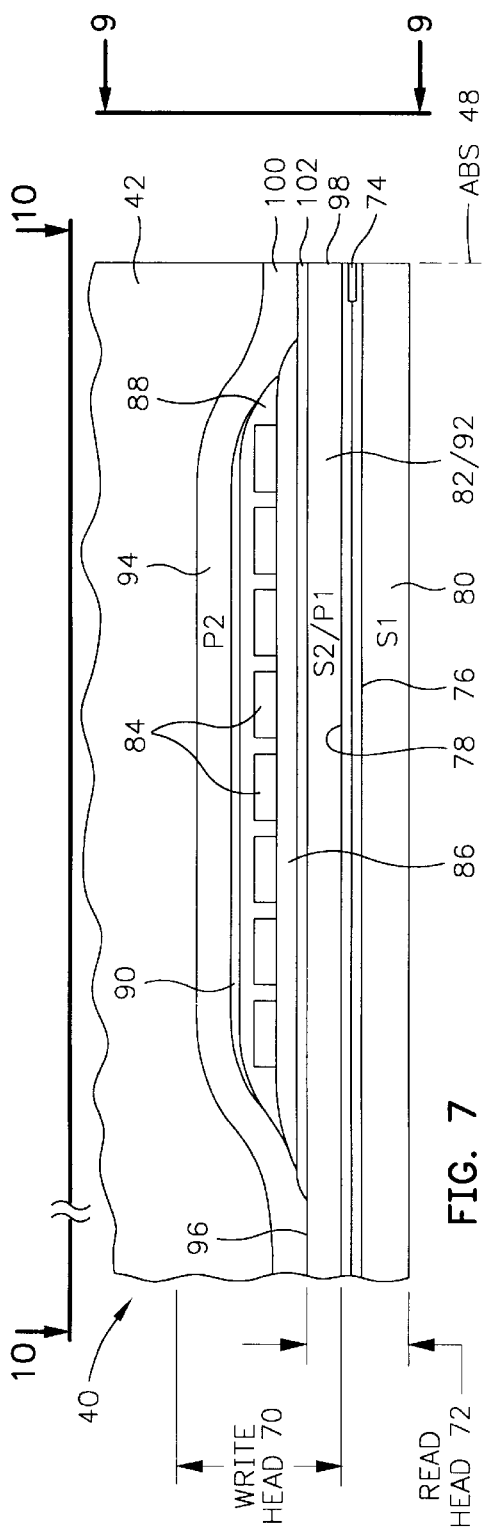

(ABS)

PROPERLY BIASED AP PINNED SPIN VALVE SENSOR WITH A METALLIC PINNING LAYER AND NO READ GAP OFFSET

BACKGROUND OF THE INVENTION

1. Field of the Invention

The present invention relates to a properly biased antiparallel (AP) pinned spin valve sensor with a metallic pinning layer and no read gap offset and, more particularly, to such a spin valve sensor wherein a net demagnetizing field $H_D$ and a net sense current field $H_I$ acting on a free layer of the sensor is counterbalanced by a ferromagnetic coupling field $H_F$ and a biasing field $H_B$ acting on the free layer.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfacing of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing equal positive and negative fields from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced. The location of the bias point on the transfer curve is typically influenced by four major forces on the free layer, namely a ferromagnetic coupling field $H_F$ between the pinned layer and the free layer, a net demagnetizing field $H_D$ from the pinned layer, a sense current field $H_I$ from all conductive layers of the spin valve except the free layer and a net image current field $H_{IM}$ from the first and second shield layers.

A gap offset is employed for obtaining the net image sense current field on the free layer from the first and second shield layers. A gap offset is where the free layer is located closer to one of the shield layers, typically the second shield layer, than the other shield layer, typically the first shield layer. The image current field from a shield layer is due to an image current in the shield layer which, in turn, is caused by the sense current flowing through the spin valve sensor. With increasing linear bit density read heads, a gap offset becomes impractical because of the risk of shorting between first and second lead layers and one of the shield layers, typically the second shield layer. Accordingly, the free layer should be centered (no offset) between the first and second shield layers in order to promote linear bit density. In such a read head the net image current field is not available for properly biasing the free layer.

An antiparallel pinned (AP) spin valve sensor is employed for reducing the aforementioned demagnetizing field $H_D$. In contrast to a single pinned layer an AP pinned layer structure has a nonmagnetic spacer layer which is located between ferromagnetic first and second AP pinned layers. The first AP pinned layer, which may comprise several ferromagnetic thin films, is exchange-coupled to the pinning layer, with its magnetic moment pinned by the pinning layer in a first direction. The magnetic moment of the second AP pinned layer is pinned in a second direction that is antiparallel to the direction of the magnetic moment of the first AP pinned layer. The magnetic moments of the first and second AP pinned layers subtractively combine to provide the AP pinned layer structure with a net magnetic moment. The direction of the net magnetic moment is determined by the thicker of the first and second AP pinned layers. The thicknesses of the first and second AP pinned layers are chosen so that the net magnetic moment is small. A small net magnetic moment equates to a small demagnetizing (demag) field exerted on the free layer by the AP pinned layer. Since the antiferromagnetic exchange coupling between the first AP pinned layer and the pinning layer is inversely proportional to the net moment, this results in a large exchange coupling between the first AP pinned layer and the pinning layer.

It is further desirable to employ a metallic material for the pinning layer instead of nickel oxide (NiO) since a metallic pinning layer can be thinner. A thinner pinning layer promotes the aforementioned linear bit density. However, a metallic pinning layer increases the net sense current field on the free layer which must be counterbalanced by other fields acting on the free layer.

Accordingly, there is a need for properly biasing the free layer when the free layer is centered between the first and second shield layers (no read gap offset), when a metallic pinning layer is employed for promoting linear bit density and when an AP pinned layer structure is employed instead of a single pinned layer for reducing the net demagnetizing field on the free layer and increasing the exchange coupling field between the first AP pinned layer and the pinning layer.

SUMMARY OF THE INVENTION

The present invention provides an AP pinned spin valve sensor which has a metallic pinning layer and which requires no read gap offset in order to properly bias a free layer of the spin valve sensor. The free layer is properly biased by a net demagnetizing field $H_D$ and a net sense current field $H_I$ acting on the free layer which are counterbalanced by a ferromagnetic coupling field $H_F$ and a biasing field $H_B$ acting on the free layer. The biasing field is accomplished by a ferromagnetic biasing layer which is separated from the free layer by a nonmagnetic isolation layer. Depending upon the direction of the sense current through the sensor, the ferromagnetic coupling field $H_F$ is either positive or negative in order to support the biasing field $H_B$. Regardless of the direction of the sense current $H_D+H_I=H_F+H_B$. The biasing layer has a high resistance and is preferably composed of cobalt iron niobium (CoFeNb) or cobalt iron niobium hafnium (CoFeNbHf). With this arrangement sense current shunting through the biasing layer is reduced. The pinned layer structure is an AP pinned layer structure which reduces the net demag $H_D$ on the free layer but, more importantly, which increases the exchange coupling field between the pinning layer and the AP pinned layer structure.

Accordingly, the pinning of the magnetic moment of the AP pinned layer structure is increased when the read head is subjected to unwanted thermal transients. The preferred pinning layer is platinum manganese (PtMn) which permits the ferromagnetic coupling field to be either positive or negative, which is thinner than a nickel oxide (NiO) pinning layer and which supports the sense current field $H_I$ acting on the free layer.

An object of the present invention is to provide a spin valve sensor wherein a net demagnetizing field of an AP pinned layer structure and a net sense current field of all conductive layers other than the free layer is counterbalanced by a net ferromagnetic coupling field and a net biasing field acting on the free layer.

Another object is to provide the foregoing sensor wherein a pinning layer of the sensor is metal and a biasing layer of the sensor has a high resistance as compared to the other ferromagnetic layers of the sensor.

A further object is to provide the foregoing sensors with a sense current field which supports a pinning action between the pinning layer and the AP pinned layer of the sensor.

Still another object is to provide the foregoing sensor with a platinum manganese pinning layer and a copper spacer layer which can be provided with one thickness for providing a positive ferromagnetic coupling field and another thickness for providing a negative ferromagnetic coupling field.

Still a further object is to provide a method for making any of the foregoing spin valve sensors.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
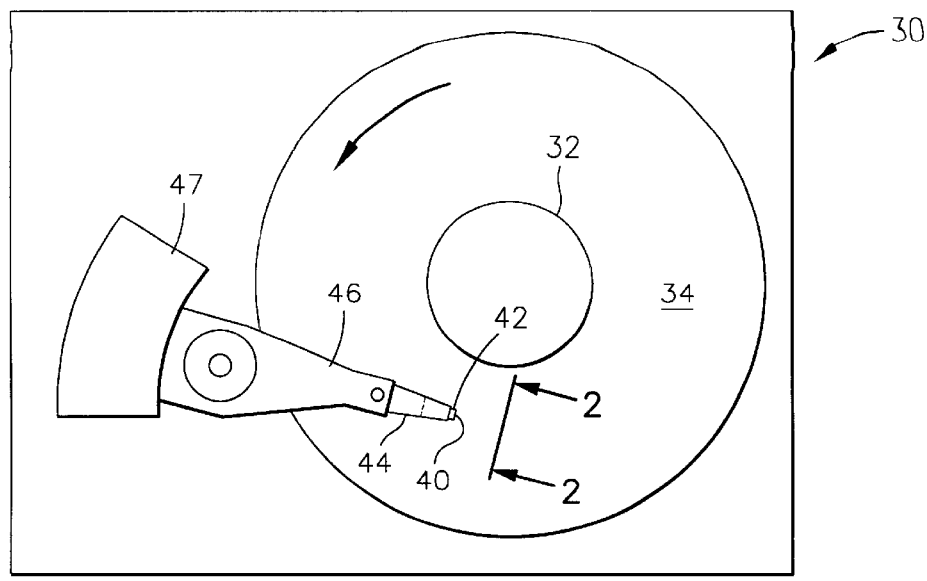
FIG. 1 is a plan view of an exemplary magnetic disk drive.
Figure 2:
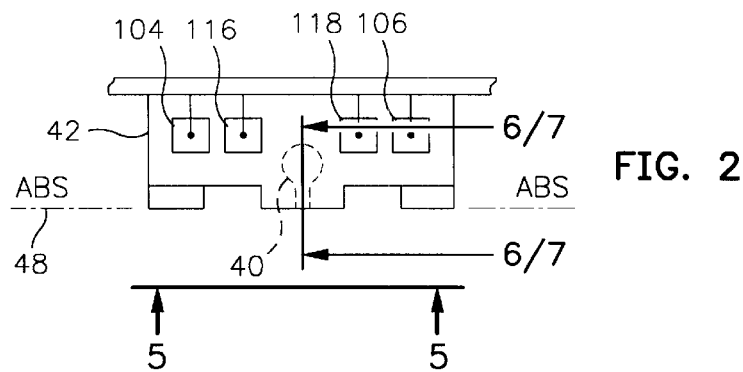
FIG. 2 is an end view of a slider with a magnetic head of the disk drive as seen in plane 2—2 of FIG. 1.
Figure 3:
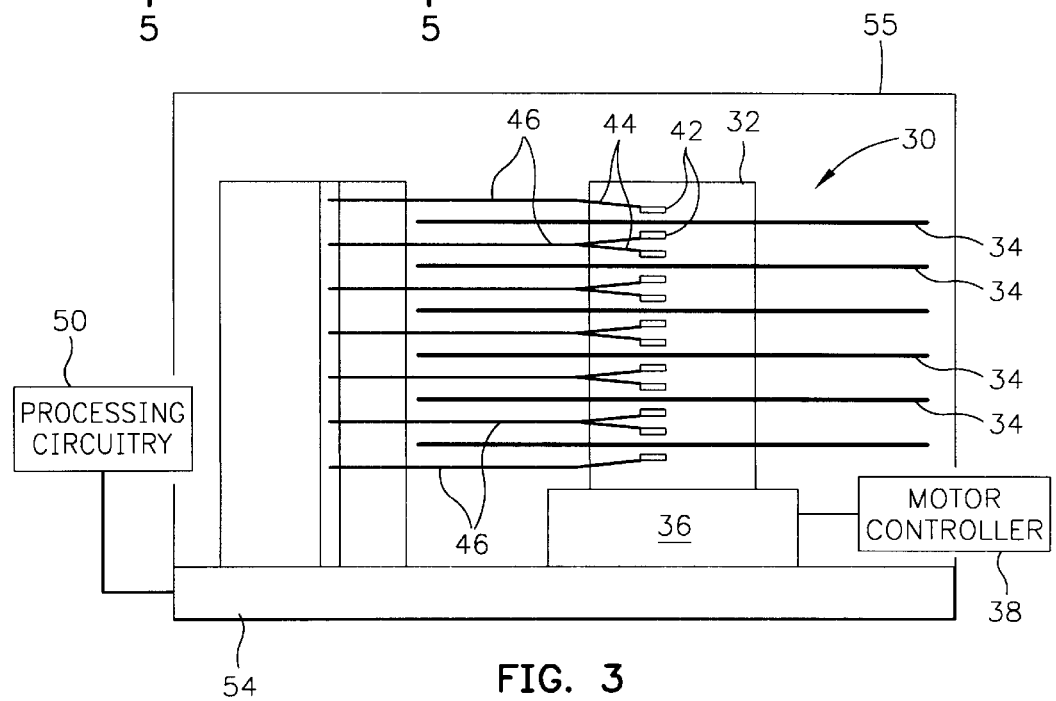
FIG. 3 is an elevation view of the magnetic disk drive wherein multiple disks and magnetic heads are employed.
Figure 4:
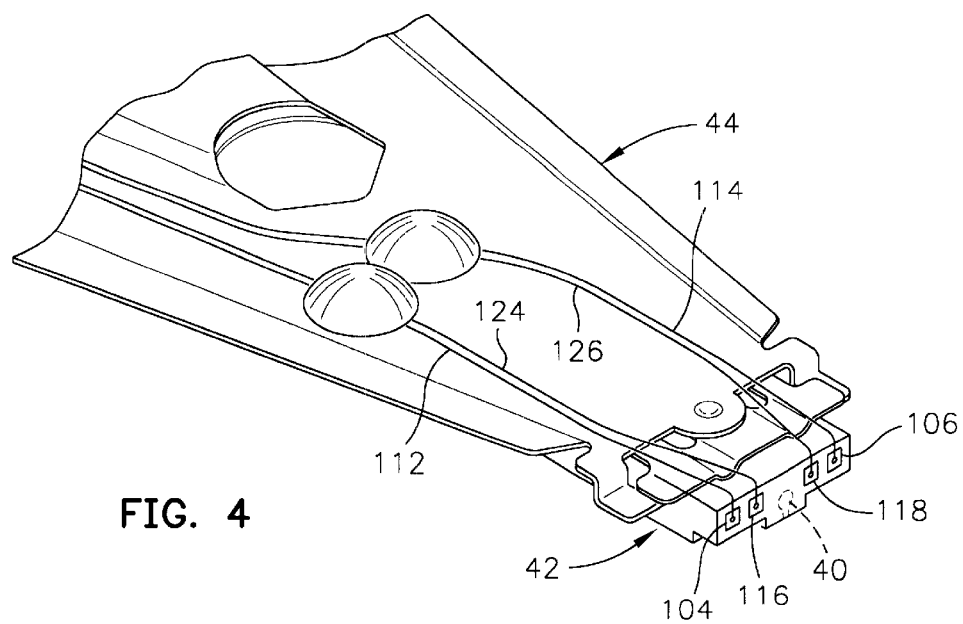
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
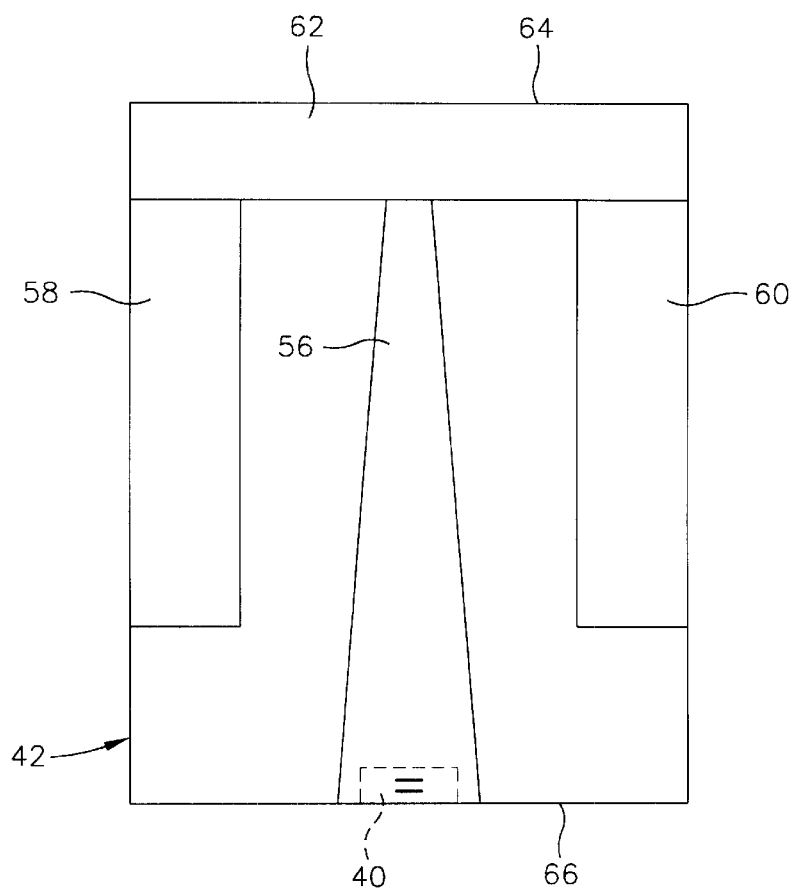
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
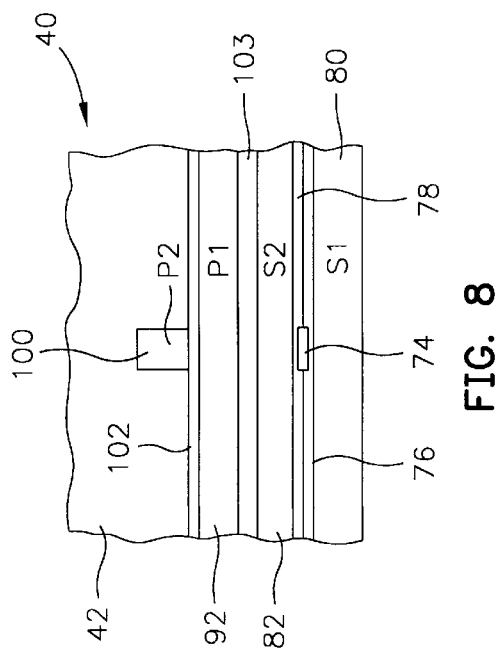
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
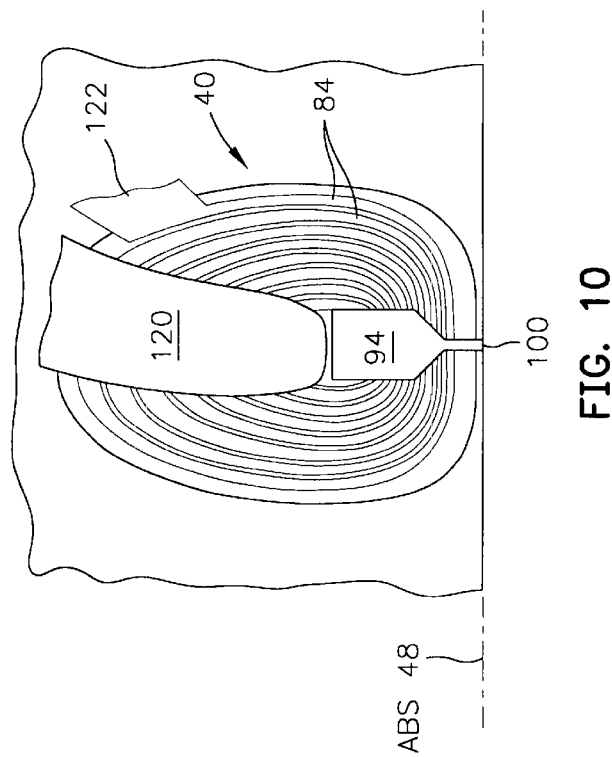
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
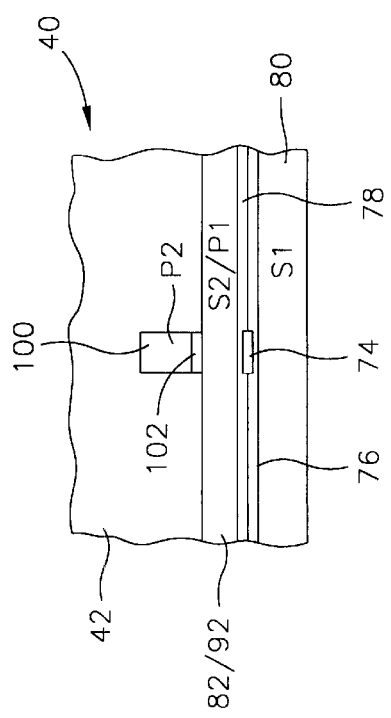
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and first pole piece layer 92 are a common layer. This type of head is known as a merged magnetic head. The insulation layer 103 of the piggyback head in FIGS. 6 and 8 is omitted.

Figure 11:
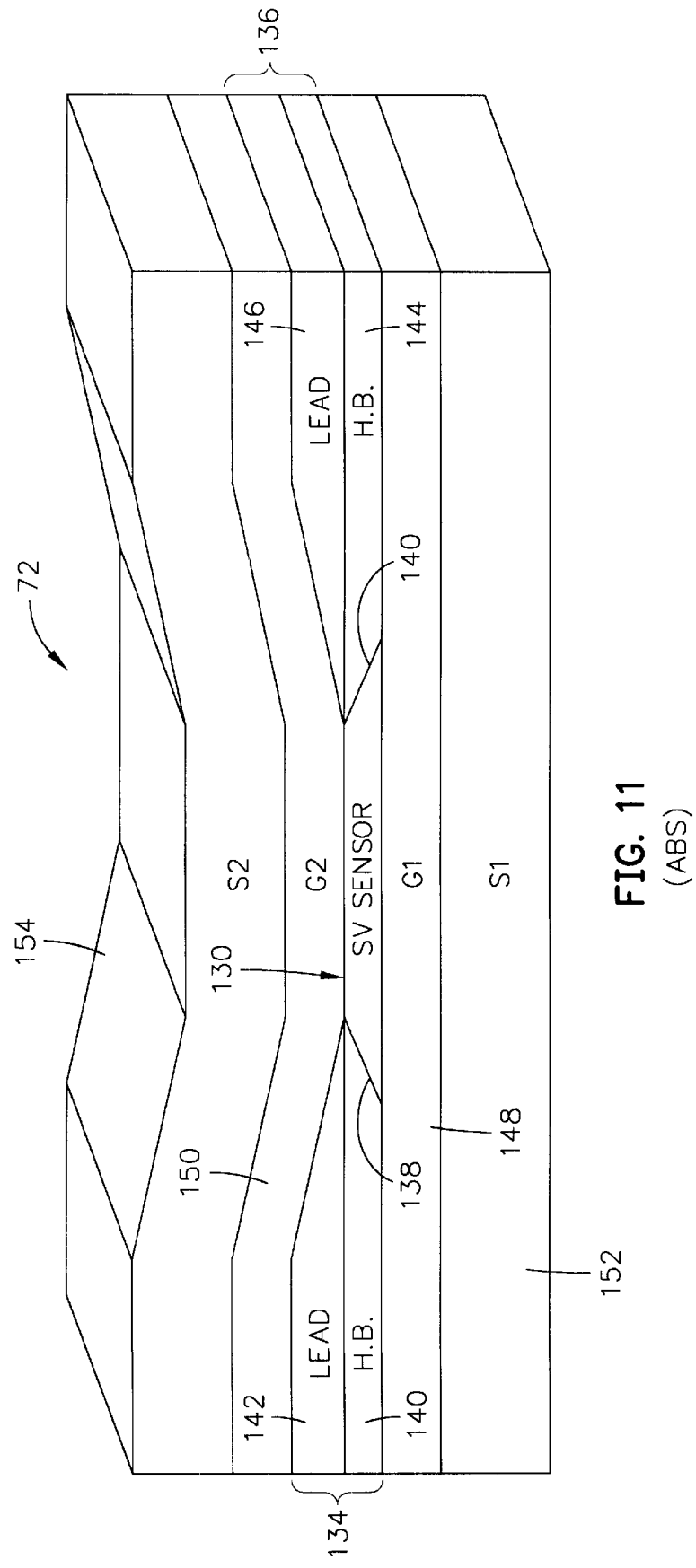
FIG. 11 is an enlarged isometric ABS illustration of a read head which has a spin valve sensor.

FIG. 11 is an isometric ABS illustration of the read head 72 shown in FIGS. 6 or 8. The read head 72 includes the present spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The Invention

Figure 12:
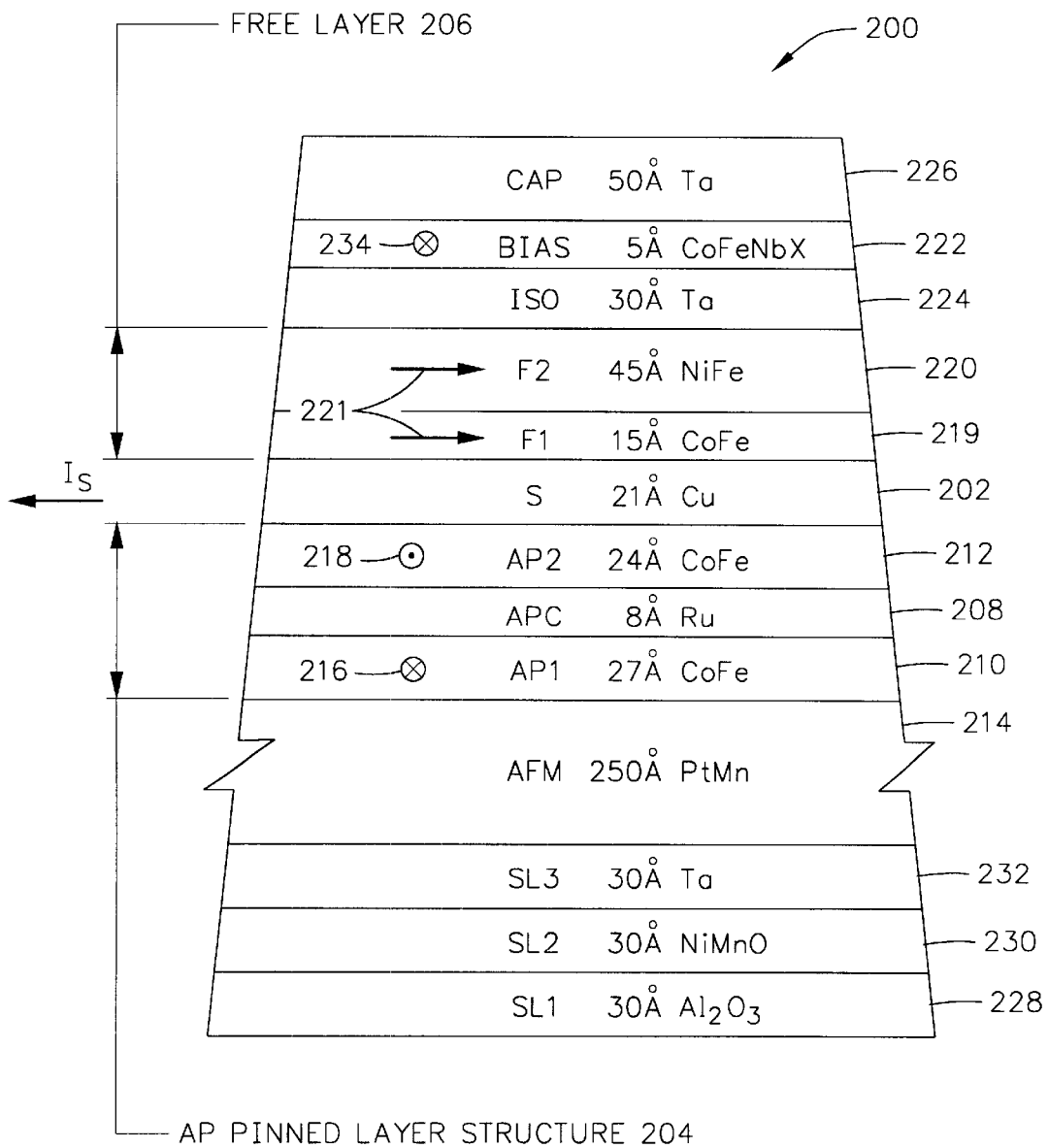
FIG. 12 is an ABS illustration of a first embodiment of the present spin valve sensor.

FIG. 12 is an ABS illustration of a first embodiment 200 of the present spin valve sensor. The sensor includes a nonmagnetic metallic spacer layer 202 which is located between an antiparallel (AP) pinned layer structure 204 and a free layer 206. The pinned layer structure 204 includes an antiparallel coupling (APC) layer 208 which is located between ferromagnetic first and second AP pinned layers (AP1) and (AP2) 210 and 212. The first AP pinned layer 210 interfaces and therefore is exchange coupled to an antiferromagnetic (AFM) pinning layer 214 which pins a magnetic moment 216 of the first AP pinned layer perpendicular to the ABS and into the sensor, as shown in FIG. 12. By a strong antiparallel coupling between the first and second AP pinned layers 210 and 212 the second AP pinned layer has a magnetic moment 218 which is pinned antiparallel to the magnetic moment 216.

The free layer 206 may comprise first and second free films (F1) and (F2) 219 and 220 which have a magnetic moment 221 which is directed parallel to the ABS, such as from left to right, as shown in FIG. 12. A sense current $I_S$ is conducted through the spin valve sensor, such as from right to left, as shown in FIG. 12. When a signal field from a track of a rotating magnetic disk rotates the magnetic moment 221 of the free layer 206 upwardly into the spin valve sensor, the magnetic moments 218 and 221 become more antiparallel which increases the resistance of the sensor to the sense current $I_S$, and when a signal field rotates the magnetic moment 221 downwardly out of the spin valve sensor relative to the ABS the magnetic moments 218 and 221 become more parallel which decreases the resistance of the sensor to the sense current $I_S$.

A biasing layer (BIAS) 222 is located on a side of the free layer 206 opposite the AP pinned layer structure 204. The biasing layer 222 is composed of a ferromagnetic material which has a high resistance, which is preferably cobalt iron niobium (CoFeNb) or cobalt iron niobium hafnium (CoFeNbHf). Cobalt iron provides the required magnetism, niobium provides a high resistance by maintaining an amorphous state of the material and hafnium makes a magnetostriction of the material more negative so as to reduce stress-induced magnetoresistance. The preferred material for the biasing layer is $Co_{85}Fe_2Nb_{11}Hf_2$. Since the free layer 206 and the biasing layer 222 are ferromagnetic materials, they are separated from each other by a nonmagnetic isolation layer (ISO) 224. The biasing layer is protected from subsequent processing steps by a cap layer 226 which may be tantalum (Ta).

Figure 13:
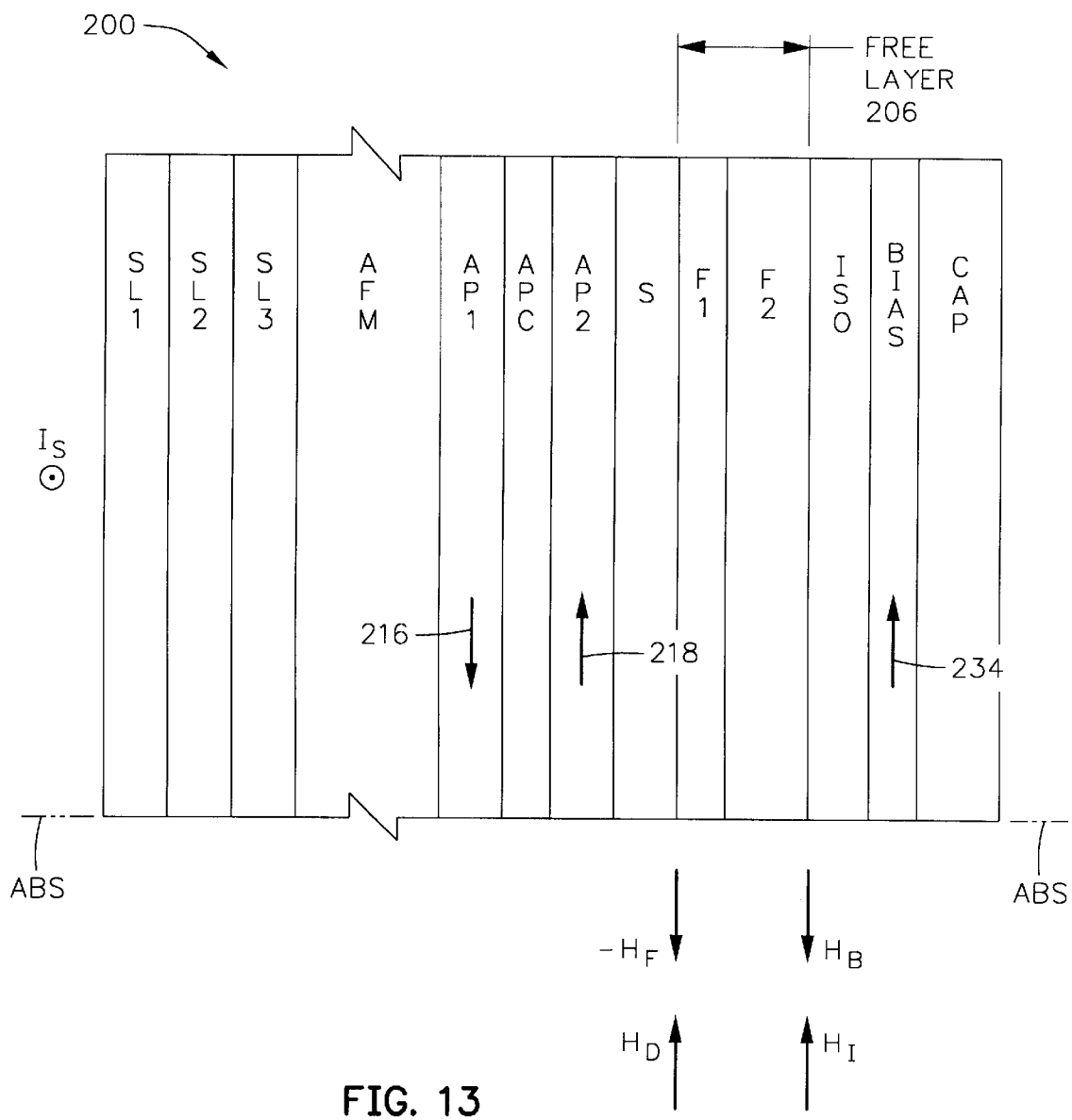
FIG. 13 is a left side view of FIG. 12 rotated 90° clockwise.
Figure 16:
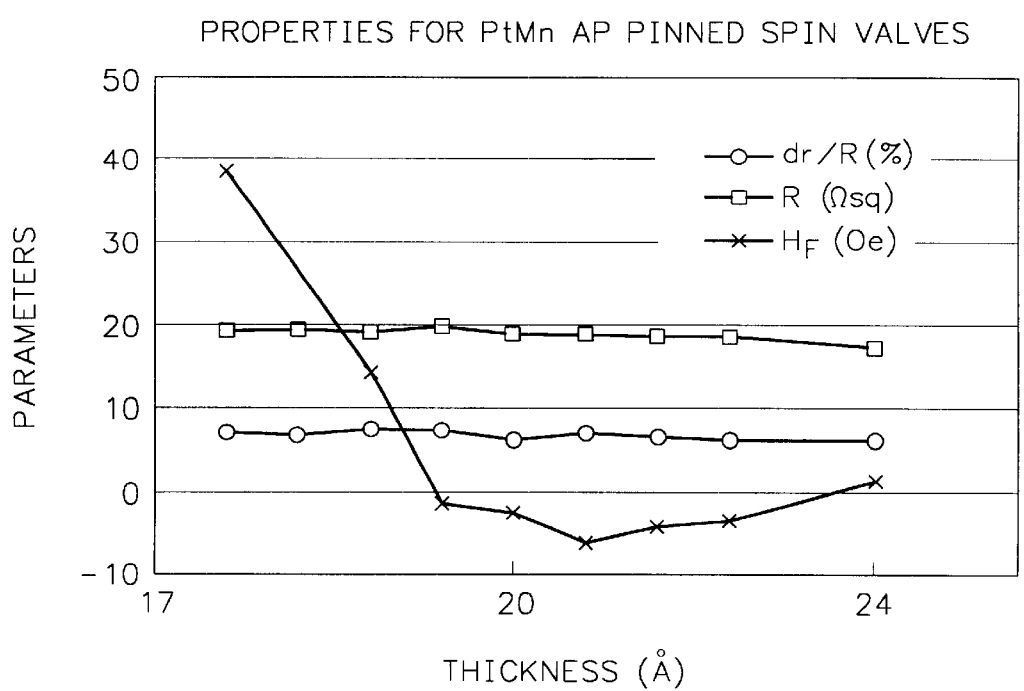
FIG. 16 is a graph showing various parameters of a platinum manganese (PtMn) AP pinned spin valve versus various thicknesses of a copper spacer layer.

The preferred pinning layer is platinum manganese (PtMn) which is formed on first, second and third seed layers (SL1), (SL2), (SL3) 228, 230 and 232. The first seed layer 228 is 30 Å of aluminum oxide ($Al_2O_3$), the second seed layer 230 is 30 Å of nickel manganese oxide (NiMnO) and the third seed layer 232 is 30 Å of tantalum (Ta). The platinum manganese (PtMn) pinning layer 214 is preferably 250 Å thick and interfaces the third seed layer 232. FIG. 16 shows a graph for AP pinned spin valves which employ the first, second and third seed layers 228, 230 and 232 and the pinning layer 214 shown in FIG. 12 for various parameters including magnetoresistive coefficient dr/R, resistance R and ferromagnetic coupling field $H_F$ of the spin valve for various thicknesses of the spacer layer 202 when composed of copper (Cu). According to the graph in FIG. 16, when the thickness of the spacer layer 202 is between about 19.5 Å to 24 Å the ferromagnetic coupling field $H_F$ on the free layer 206 is negative and when the thickness of the spacer layer is about 17.5 Å to 19.5 Å the ferromagnetic coupling field $H_F$ on the free layer is positive. The ferromagnetic coupling field $H_F$ on the free layer 206 is caused by the magnetic moment 218 of the second AP pinned layer 212 and is positive when it is parallel to the magnetic moment 218 and is negative when it is antiparallel to the magnetic moment 218. In the embodiment of the invention shown in FIG. 12, the ferromagnetic coupling field is negative in order to achieve proper biasing of the free layer 206, as shown in FIG. 13. In order to achieve a negative ferromagnetic coupling field the spacer layer 222 may be 21 Å thick, as shown in FIG. 12.

The biasing layer 222 has a magnetic moment 234 which is pinned upwardly into the head, as shown in FIG. 12, by sense current fields from conductive layers of the spin valve sensor. As the sense current $I_S$ is conducted from right to left, sense current fields from all the conductive layers below the biasing layer 222 are directed into the biasing layer which causes this pinning action. The demagnetizing field from the biasing layer on the free layer 206 due to the magnetic moment 234 is represented by $H_B$ in FIG. 13.

Other fields acting on the free layer 206 are a net demagnetizing field $H_D$ and a net sense current field $H_I$. The net demagnetizing field $H_D$ comes from the AP pinned layer structure 204. However, the demagnetizing field from the AP pinned layer structure 204 is small since there is flux closure between the first and second AP pinned layers 210 and 212. Since the first AP pinned layer 210 has been selected to be thicker than the second AP pinned layer 212, the first AP pinned layer causes a demagnetizing field to be exerted on the free layer structure 206 due to the magnetic moment 216. A very small demagnetizing field $H_B$ also comes from the biasing layer 222 which slightly counterbalances the demagnetizing field $H_D$ from the AP pinned layer structure 204. The sense current field $H_I$ on the free layer 206 is a net sense current field from all of the conductive layers of the spin valve sensor other than the free layer 206. The majority of the sense current fields comes from the conductive layers below the free layer 206 in FIG. 12 which includes the spacer layer 202, the second AP pinned layer 212, the first AP pinned layer 210 and the pinning layer 214. This is slightly counterbalanced by a sense current field coming from the biasing layer 222. However, because of the high resistance of the biasing layer 222, this counterbalancing is negligible. It can be seen from FIG. 13 that the sense current field $H_I$ supports the demagnetizing field $H_D$ and that the ferromagnetic coupling field $-H_F$ supports the biasing field $H_B$. Accordingly, $H_D+H_I=H_F+H_B$. In the preferred embodiment, these are the only fields that are required to properly bias the free layer 206. Accordingly, the free layer 206 does not have to be offset relative to the first and second shield layers 152 and 154 in FIG. 11 in order to obtain a net image current field $H_{IM}$ for properly biasing the free layer.

It is important to note that the direction of the sense current $I_S$ in FIG. 12 supports the pinning of the magnetic moment 216 of the thicker of the first and second AP pinned layers 210 and 212 so as to permit a resetting of the spin valve sensor during fabrication of the sensor or after the sensor becomes operational in a magnetic disk drive. By sending a current pulse of approximately three times the magnitude of the typical sense current through the sense current circuit, such as 3×0.3 MV=0.9 MV, the temperature of the platinum manganese (PtMn) pinning layer 214 is raised to allow its magnetic spins to be sufficiently free for rotation, so that when the sense current fields from the conductive layers in the spin valve sensor orient the magnetic moment 216 perpendicular to and into the page in FIG. 12 the magnetic spins of the pinning layer 214 are properly oriented, so that when the pulse is terminated and the pinning layer cools the magnetic spins of the pinning layer 214 are set in place for pinning the magnetic moment 216 perpendicular to and into the page, as shown in FIG. 12. Further, the direction of the sense current $I_S$ in FIG. 12 causes the conductive layers of the spin valve sensor to reinforce the direction of the magnetic moment 216 so that when the spin valve sensor is subjected to thermal spikes, which causes the magnetic spins of the pinning layer 214 to once again become free to rotate, the magnetic moment 216 is maintained in its pinning direction by the sense current fields so that when the spin valve sensor cools, after the thermal gradient has terminated, there has been no change in the pinning relationship between the pinning layer 214 and the first AP pinned layer 210.

Preferred thicknesses and materials for layers of the spin valve sensor not already discussed are 27 Å of cobalt iron (CoFe) for the first AP pinned layer 210, 8 Å of ruthenium (Ru) for the antiparallel coupling layer 208, 24 Å of cobalt iron (CoFe) for the second AP pinned layer 212, 21 Å of copper (Cu) for the spacer layer 202, 15 Å of cobalt iron (CoFe) for the first free film 219, 45 Å of nickel iron (NiFe) for the second free film 220, 30 Å of tantalum (Ta) for the isolation layer 224, 5 Å of cobalt iron niobium hafnium (CoFeNbHf) for the bias layer 222 and 50 Å of tantalum (Ta)

for the cap layer 226. It has been found that when the free layer 206 includes a cobalt iron film 219 between the copper spacer layer 202 and the second free film 220 the magnetoresistive coefficient dr/R is enhanced. It should also be noted that the copper spacer layer is 21 Å thick which results in a negative ferromagnetic coupling field $H_F$ of about $-7$ Oe, as shown by the chart in FIG. 16.

Figure 14:
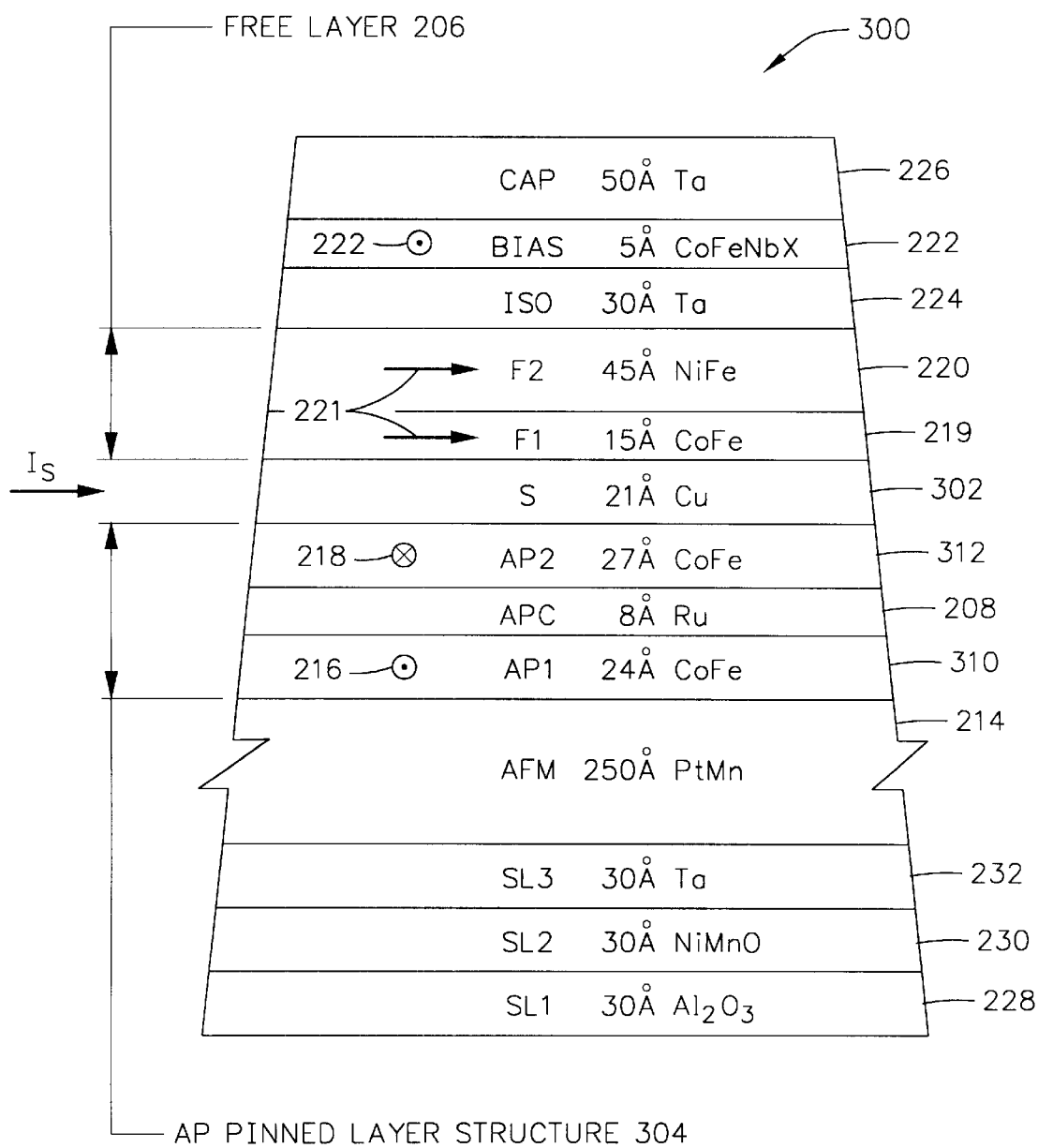
FIG. 14 is an ABS illustration of a second embodiment of the present spin valve sensor.
Figure 15:
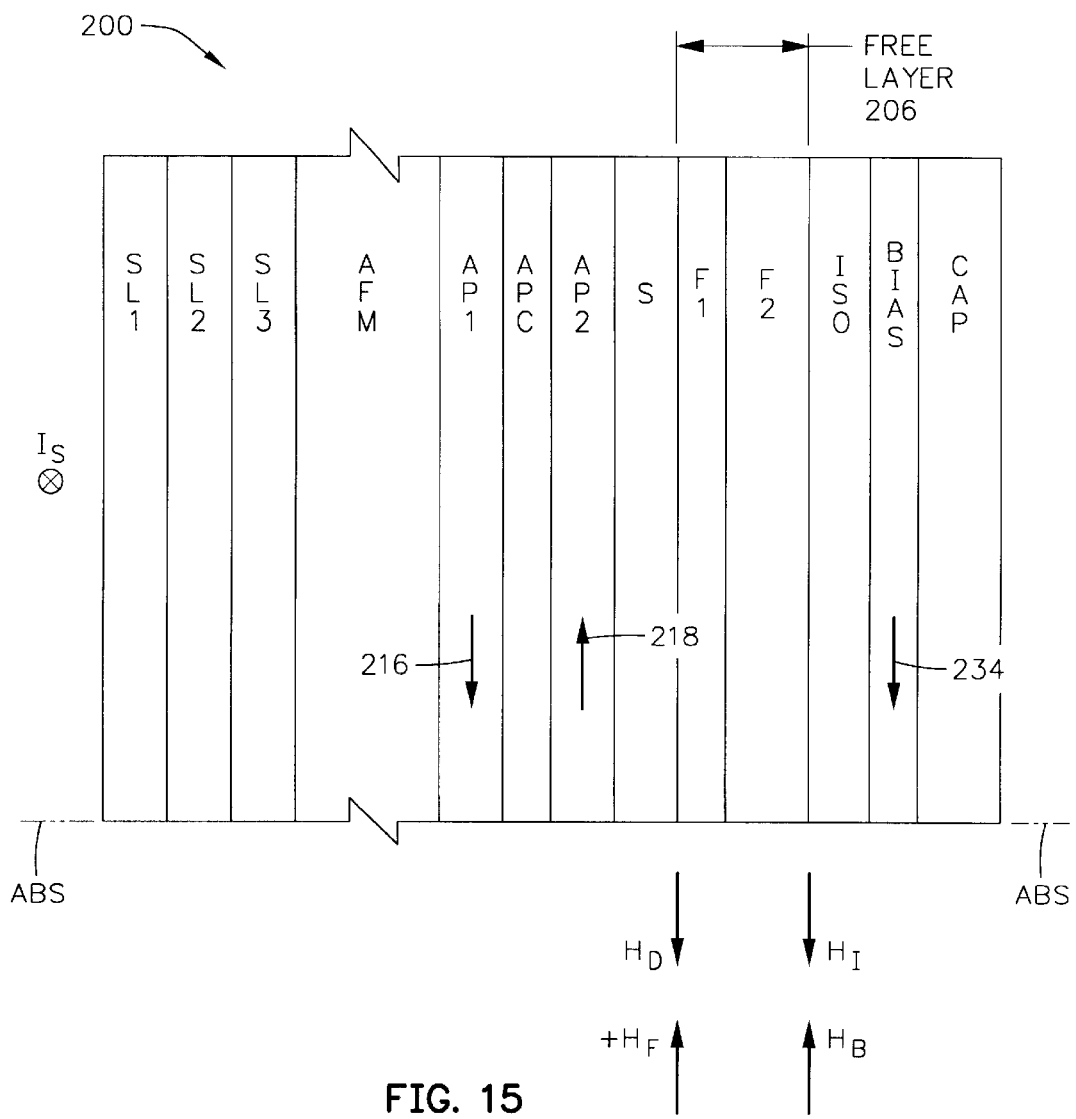
FIG. 15 is a left side view of FIG. 14 rotated 90° clockwise.

FIG. 14 is an ABS illustration of a second embodiment 300 of the present spin valve sensor which is the same as the spin valve sensor 200 in FIG. 12 except a spacer layer 302 is 19 Å thick instead of 21 Å thick, the second AP pinned layer 312 is thicker than the first AP pinned layer 310 and the sense current field $I_S$ is directed from left to right instead of from right to left, as shown in FIG. 12. With a 19 Å thick copper spacer layer 302, as shown in FIG. 14, it can be seen from the graph in FIG. 16 that the ferromagnetic coupling field $H_F$ is approximately $+7$ Oe which is represented by $+H_F$ in FIG. 15. Since the second AP pinned layer 312 is thicker than the first AP pinned layer 310 the net demagnetizing field $H_D$ in FIG. 15 is antiparallel to the net demagnetizing field $H_D$ in FIG. 13. Since the sense current $I_S$ in FIG. 14 is antiparallel to the sense current $I_S$ in FIG. 12 the net sense current field $H_I$ and the demagnetizing field from the biasing layer $H_B$ in FIG. 15 are antiparallel to the fields $H_I$ and $H_B$ in FIG. 13.

Discussion

It should be understood that the materials for most of the layers and films of the spin valve sensors in FIGS. 12 and 14 are exemplary except the biasing layer 222 which is preferably cobalt iron niobium (CoFeNb) or cobalt iron niobium hafnium (CoFeNbHf). The preferred atomic percentage by weight ranges for the CoFeNb are $Co_{80-90}Fe_{1-5}Nb_{5-11}$ with the preferred percentages being $Co_{87}Fe_2Nb_{11}$ and the preferred atomic percentage by weight ranges for CoFeNbHf are $Co_{80-90}Fe_{1-5}Nb_{5-11}Hf_{1-5}$ with the preferred percentages being $Co_{85}Fe_2Nb_{11}Hf_2$. For instance, the first and second AP pinned layers (AP1) and (AP2) may be cobalt (Co) instead of cobalt iron (CoFe). The CoFe is preferably $Co_{90}Fe_{10}$ atomic percentage by weight. The pinning layer may be other metallic materials such as nickel manganese (NiMn) or iridium manganese (IrMn) and the seed layers may be other materials as desired. If the first gap layer is aluminum oxide ($Al_2O_3$) this may take the place of the first seed layer 228. The preferred pinning layer is platinum manganese ($Pt_{50}Mn_{50}$) and the preferred materials for the seed layers 228, 230 and 232 are that as described hereinabove since the ferromagnetic coupling field can be fashioned to be either positive or negative. It should be understood that the spin valve sensors 200 or 300 may be employed in place of the spin valve sensor 130 in FIG. 11 and employed in the magnetic disk drive illustrated in FIGS. 1–5.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor including:
      an antiparallel (AP) pinned layer structure having a magnetic moment;
      an antiferromagnetic pinning layer exchange coupled to the AP pinned layer structure for pinning the magnetic moment in a predetermined pinned direction;
      a ferromagnetic free layer that has a magnetic moment that is free to rotate;
      a nonmagnetic conductive spacer layer located between the AP pinned layer structure and the free layer;
      a ferromagnetic biasing layer that has a magnetic moment which can be pinned antiparallel to the pinned direction of the AP pinned layer structure by a net sense current field on the biasing layer from conductive layers of the spin valve sensor;
      a nonmagnetic isolation layer located between the free layer and the biasing layer;
      the biasing layer being composed of CoFeNb or CoFeNbHf;
      the AP pinned layer structure exerting a net demagnetizing field $H_D$ and a ferromagnetic coupling field $H_F$ on the free layer, the conductive layers of the spin valve sensor exerting a net sense current field $H_I$ on the free layer and the biasing layer exerting a biasing field $H_B$ on the free layer; and $H_D+H_I=H_F+H_B$.

2. A magnetic read head as claimed in claim 1 including:
   nonmagnetic nonconductive first and second read gap layers;
   the spin valve sensor being located between the first and second read gap layers;
   ferromagnetic first and second shield layers;
   the first and second read gap layers being located between the first and second shield layers with the first read gap layer interfacing the first shield layer and the second read gap layer interfacing the second shield layer.

3. A magnetic read head as claimed in claim 2 wherein the AP pinned layer structure includes:
   ferromagnetic first and second antiparallel (AP) pinned layers;
   an antiparallel coupling (APC) layer located between the first and second AP pinned layers; and
   the first AP pinned layer having said magnetic moment of the AP pinned layer structure and the second AP pinned layer having a magnetic moment that is antiparallel to the magnetic moment of the first AP pinned layer.

4. A magnetic read head as claimed in claim 3 wherein the biasing layer is CoFeNbHf.

5. A magnetic read head as claimed in claim 4 wherein $H_F$ is positive so as to be in the same direction as the magnetic moment of the second AP pinned layer.

6. A magnetic read head as claimed in claim 5 including first, second and third seed layers composed of $Al_2O_3$, NiMnO and Ta respectively with the second seed layer being located between the first and third seed layers; and
   the pinning layer being composed of PtMn and interfacing the third seed layer.

7. A magnetic read head as claimed in claim 6 wherein the CoFeNbHf is $Co_{80-90}Fe_{1-5}Nb_{5-11}Hf_{1-5}$.

8. A magnetic read head as claimed in claim 4 wherein $H_F$ is negative so as to be antiparallel to the direction of the magnetic moment of the second AP pinned layer.

9. A magnetic read head as claimed in claim 8 including first, second and third seed layers composed of $Al_2O_3$, NiMnO and Ta respectively with the second seed layer being located between the first and third seed layers; and
   the pinning layer being composed of PtMn and interfacing the third seed layer.

10. A magnetic read head as claimed in claim 9 wherein the CoFeNbHf is $Co_{80-90}Fe_{1-5}Nb_{5-11}Hf_{1-5}$.

11. A magnetic head assembly comprising:

a write head including:
- ferromagnetic first and second pole piece layers that have a yoke portion located between a pole tip portion and a back gap portion;
- a nonmagnetic write gap layer located between the pole tip portions of the first and second pole piece layers;
- an insulation stack with at least one coil layer embedded therein located between the yoke portions of the first and second pole piece layers; and
- the first and second pole piece layers being connected at their back gap portions; and a read head including:
- nonmagnetic nonconductive first and second read gap layers;
- a spin valve sensor located between the first and second read gap layers;
- ferromagnetic first and second shield layers; and
- the first and second read gap layers being located between the first and second shield layers with the first read gap layer interfacing the first shield layer and the second read gap layer interfacing the second shield layer;

the spin valve sensor including:
- an antiparallel (AP) pinned layer structure having a magnetic moment;
- an antiferromagnetic pinning layer exchange coupled to the AP pinned layer structure for pinning the magnetic moment in a predetermined pinned direction;
- a ferromagnetic free layer that has a magnetic moment that is free to rotate;
- a nonmagnetic conductive spacer layer located between the AP pinned layer structure and the free layer;
- a ferromagnetic biasing layer that has a magnetic moment which can be pinned antiparallel to said magnetic moment of the pinned layer structure by a net sense current field on the biasing layer from conductive layers of the spin valve sensor;
- a nonmagnetic isolation layer located between the free layer and the biasing layer;
- the biasing layer being composed of CoFeNb or CoFeNbHf;
- the AP pinned layer structure exerting a net demagnetizing field $H_D$ and a ferromagnetic coupling field $H_F$ on the free layer, the conductive layers of the spin valve sensor exerting a net sense current field $H_I$ on the free layer and the biasing layer exerting a biasing field $H_B$ on the free layer; and
- $H_D+H_I=H_F+H_B$.

12. A magnetic head assembly as claimed in claim 11 wherein the first pole layer and the second shield layer are a common layer.

13. A magnetic head assembly as claimed in claim 11 including a nonmagnetic isolation layer located between the second shield layer and the first pole piece layer.

14. A magnetic head assembly as claimed in claim 11 wherein the AP pinned layer structure includes:
- ferromagnetic first and second antiparallel (AP) pinned layers;
- an antiparallel coupling (APC) layer located between the first and second AP pinned layers; and
- the first AP pinned layer having said magnetic moment of the AP pinned layer structure and the second AP pinned layer having a magnetic moment that is antiparallel to the magnetic moment of the first AP pinned layer.

15. A magnetic head assembly as claimed in claim 14 wherein the biasing layer is CoFeNbHf.

16. A magnetic head assembly as claimed in claim 15 wherein $H_F$ is positive so as to be in the same direction as the magnetic moment of the second AP pinned layer.

17. A magnetic head assembly as claimed in claim 16 including first, second and third seed layers composed of $Al_2O_3$, NiMnO and Ta respectively with the second seed layer being located between the first and third seed layers; and
- the pinning layer being composed of PtMn and interfacing the third seed layer.

18. A magnetic head assembly as claimed in claim 17 wherein the CoFeNbHf is $Co_{80-90}Fe_{1-5}Nb_{5-11}Hf_{1-5}$.

19. A magnetic head assembly as claimed in claim 15 wherein $H_F$ is negative so as to be antiparallel to the direction of the magnetic moment of the second AP pinned layer.

20. A magnetic head assembly as claimed in claim 19 including first, second and third seed layers composed of $Al_2O_3$, NiMnO and Ta respectively with the second seed layer being located between the first and third seed layers; and
- the pinning layer being composed of PtMn and interfacing the third seed layer.

21. A magnetic head assembly as claimed in claim 20 wherein the CoFeNbHf is $Co_{80-90}Fe_{1-5}Nb_{5-11}Hf_{1-5}$.

22. A magnetic disk drive including at least one magnetic head assembly that includes a write head and a read head, the read head including a spin valve sensor, comprising:

the write head including:
- ferromagnetic first and second pole piece layers that have a yoke portion located between a pole tip portion and a back gap portion;
- a nonmagnetic write gap layer located between the pole tip portions of the first and second pole piece layers;
- an insulation stack with at least one coil layer embedded therein located between the yoke portions of the first and second pole piece layers; and
- the first and second pole piece layers being connected at their back gap portions; and the read head including:
- nonmagnetic nonconductive first and second read gap layers;
- a spin valve sensor located between the first and second read gap layers;
- ferromagnetic first and second shield layers;
- the first and second read gap layers being located between the first and second shield layers with the first read gap layer interfacing the first shield layer and the second read gap layer interfacing the second shield layer;

the spin valve sensor including:
- an antiparallel (AP) pinned layer structure having a magnetic moment;
- an antiferromagnetic pinning layer exchange coupled to the AP pinned layer structure for pinning the magnetic moment in a predetermined pinned direction;
- a ferromagnetic free layer that has a magnetic moment that is free to rotate;
- a nonmagnetic conductive spacer layer located between the AP pinned layer structure and the free layer;
- a ferromagnetic biasing layer that has a magnetic moment which can be pinned antiparallel to said predetermined pinned direction by a net sense current field on the biasing layer from conductive layers of the spin valve sensor;

a nonmagnetic isolation layer located between the free layer and the biasing layer;

the biasing layer being composed of CoFeNb or CoFeNbHf;

the AP pinned layer structure exerting a net demagnetizing field $H_D$ and a ferromagnetic coupling field $H_F$ on the free layer, the conductive layers of the spin valve sensor exerting a net sense current field $H_I$ on the free layer and the biasing layer exerting a biasing field $H_B$ on the free layer; and $H_D+H_I=H_F+H_B$;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

23. A magnetic disk drive as claimed in claim 22 wherein the first pole layer and the second shield layer are a common layer.

24. A magnetic disk drive as claimed in claim 22 including a nonmagnetic isolation layer located between the second shield layer and the first pole piece layer.

25. A magnetic disk drive as claimed in claim 22 wherein the AP pinned layer structure includes:

ferromagnetic first and second antiparallel (AP) pinned layers;

an antiparallel coupling (APC) layer located between the first and second AP pinned layers; and the first AP pinned layer having said magnetic moment of the AP pinned layer structure and the second AP pinned layer having a magnetic moment that is antiparallel to the magnetic moment of the first AP pinned layer.

26. A magnetic disk drive as claimed in claim 25 wherein the biasing layer is CoFeNbHf.

27. A magnetic disk drive as claimed in claim 26 wherein $H_F$ is positive so as to be in the same direction as the magnetic moment of the second AP pinned layer.

28. A magnetic disk drive as claimed in claim 27 including first, second and third seed layers composed of $Al_2O_3$, NiMnO and Ta respectively with the second seed layer being located between the first and third seed layers; and the pinning layer being composed of PtMn and interfacing the third seed layer.

29. A magnetic disk drive as claimed in claim 28 wherein the CoFeNbHf is $Co_{80-90}Fe_{1-5}Nb_{5-11}Hf_{1-5}$.

30. A magnetic disk drive as claimed in claim 26 wherein $H_F$ is negative so as to be antiparallel to the direction of the magnetic moment of the second AP pinned layer.

31. A magnetic disk drive as claimed in claim 30 including first, second and third seed layers composed of $Al_2O_3$, NiMnO and Ta respectively with the second seed layer being located between the first and third seed layers; and the pinning layer being composed of PtMn and interfacing the third seed layer.

32. A magnetic disk drive as claimed in claim 31 wherein the CoFeNbHf is $Co_{80-90}Fe_{1-5}Nb_{5-11}Hf_{1-5}$.

33. A method of making a magnetic read head comprising the steps of:

making a spin valve sensor as follows:

forming an antiparallel (AP) pinned layer structure with a magnetic moment;

forming an antiferromagnetic pinning layer exchange coupled to the AP pinned layer structure for pinning the magnetic moment in a predetermined pinned direction;

forming a ferromagnetic free layer with a magnetic moment that is free to rotate;

forming a nonmagnetic conductive spacer layer between the AP pinned layer structure and the free layer;

forming a ferromagnetic biasing layer that has a magnetic moment which can be pinned antiparallel to said predetermined pinned direction by a net sense current field on the biasing layer from conductive layers of the spin valve sensor;

forming a nonmagnetic isolation layer between the free layer and the biasing layer;

forming the biasing layer of CoFeNb or CoFeNbHf;

the AP pinned layer structure exerting a net demagnetizing field $H_D$ and a ferromagnetic coupling field $H_F$ on the free layer, the conductive layers of the spin valve sensor exerting a net sense current field $H_I$ on the free layer and the biasing layer exerting a biasing field $H_B$ on the free layer; and forming the layers so that $H_D+H_I=H_F+H_B$.

34. A method of making a magnetic read head as claimed in claim 33 including:

forming nonmagnetic nonconductive first and second read gap layers;

forming the spin valve sensor between the first and second read gap layers;

forming ferromagnetic first and second shield layers with the first and second read gap layers located between the first and second shield layers and with the first read gap layer interfacing the first shield layer and the second read gap layer interfacing the second shield layer.

35. A method of making a magnetic read head as claimed in claim 34 wherein the forming of the AP pinned layer structure includes the steps of:

forming ferromagnetic first and second antiparallel (AP) pinned layers;

forming an antiparallel coupling (APC) layer between the first and second AP pinned layers; and forming the first AP pinned layer with said magnetic moment in the predetermined pinned direction of the AP pinned layer structure and the second AP pinned layer with a magnetic moment that is antiparallel to the magnetic moment of the first AP pinned layer.

36. A method of making a magnetic read head as claimed in claim 35 wherein the biasing layer is CoFeNbHf.

37. A method of making a magnetic read head as claimed in claim 36 wherein the $H_F$ is formed positive so as to be parallel to the direction of the magnetic moment of the second AP pinned layer.

38. A method of making a magnetic read head as claimed in claim 37 including forming the first, second and third seed layers of $Al_2O_3$, NiMnO and Ta respectively with the second seed layer located between the first and third seed layers; and the pinning layer being formed of PtMn and interfacing the third seed layer.

39. A method of making a magnetic read head as claimed in claim 38 wherein the forming of CoFeNbHf is $Co_{80-90}Fe_{1-5}Nb_{5-11}Hf_{1-5}$.

40. A method of making a magnetic read head as claimed in claim 36 wherein the $H_F$ is formed negative so as to be antiparallel to the direction of the magnetic moment of the second AP pinned layer.

41. A method of making a magnetic read head as claimed in claim 40 including forming the first, second and third seed layers of $Al_2O_3$, NiMnO and Ta respectively with the second seed layer located between the first and third seed layers; and the pinning layer being formed of PtMn and interfacing the third seed layer.

42. A method of making a magnetic read head as claimed in claim 41 wherein the forming of CoFeNbHf is $Co_{80-90}Fe_{1-5}Nb_{5-11}Hf_{1-5}$.

43. A method of making a magnetic head assembly comprising the steps of:

making a write head as follows:
forming ferromagnetic first and second pole piece layers that have a yoke portion located between a pole tip portion and a back gap portion;
forming a nonmagnetic write gap layer between the pole tip portions of the first and second pole piece layers;
forming an insulation stack with at least one coil layer embedded therein between the yoke portions of the first and second pole piece layers; and
connecting the first and second pole piece layers at their back gap portions; and making a read head as follows:
forming nonmagnetic nonconductive first and second read gap layers;
forming a spin valve sensor between the first and second read gap layers;
forming ferromagnetic first and second shield layers; and
forming the first and second read gap layers between the first and second shield layers with the first read gap layer interfacing the first shield layer and the second read gap layer interfacing the second shield layer;

making the spin valve sensor as follows:
forming an antiparallel (AP) pinned layer structure with a magnetic moment;
forming an antiferromagnetic pinning layer exchange coupled to the AP pinned layer structure for pinning the magnetic moment in a predetermined pinned direction;
forming a ferromagnetic free layer with a magnetic moment that is free to rotate;
forming a nonmagnetic conductive spacer layer between the AP pinned layer structure and the free layer;
forming a ferromagnetic biasing layer that has a magnetic moment which can be pinned by a net sense current field on the biasing layer from conductive layers of the spin valve sensor;
forming a nonmagnetic isolation layer between the free layer and the biasing layer;
forming the biasing layer of CoFeNb or CoFeNbHf;
the AP pinned layer structure exerting a net demagnetizing field $H_D$ and a ferromagnetic coupling field $H_F$ on the free layer, the conductive layers of the spin valve sensor exerting a net sense current field $H_I$ on the free layer and the biasing layer exerting a biasing field $H_B$ on the free layer; and
forming the layers so that $H_D + H_I = H_F + H_B$.

44. A method of making a magnetic head assembly as claimed in claim 43 wherein the first pole layer and the second shield layer are formed as a common layer.

45. A method of making a magnetic head assembly as claimed in claim 43 including forming a nonmagnetic isolation layer between the second shield layer and the first pole piece layer.

46. A method of making a magnetic head assembly as claimed in claim 43 wherein the forming of the AP pinned layer structure includes the steps of:

forming ferromagnetic first and second antiparallel (AP) pinned layers;
forming an antiparallel coupling (APC) layer between the first and second AP pinned layers; and
forming the first AP pinned layer with said magnetic moment in the predetermined pinned direction of the AP pinned layer structure and the second AP pinned layer with a magnetic moment that is antiparallel to the magnetic moment of the first AP pinned layer.

47. A method of making a magnetic head assembly as claimed in claim 46 wherein the biasing layer is CoFeNbHf.

48. A method of making a magnetic head assembly as claimed in claim 47 wherein the $H_F$ is formed positive so as to be parallel to the direction of the magnetic moment of the second AP pinned layer.

49. A method of making a magnetic head assembly as claimed in claim 48 including forming the first, second and third seed layers of $Al_2O_3$, NiMnO and Ta respectively with the second seed layer being located between the first and third seed layers; and the pinning layer being formed of PtMn and interfacing the third seed layer.

50. A method of making a magnetic head assembly as claimed in claim 49 wherein the forming of CoFeNbHf is $Co_{80-90}Fe_{1-5}Nb_{5-11}Hf_{1-5}$.

51. A method of making a magnetic head assembly as claimed in claim 47 wherein the $H_F$ is formed negative so as to be antiparallel to the direction of the magnetic moment of the second AP pinned layer.

52. A method of making a magnetic head assembly as claimed in claim 51 including forming the first, second and third seed layers of $Al_2O_3$, NiMnO and Ta respectively with the second seed layer being located between the first and third seed layers; and the pinning layer being formed of PtMn and interfacing the third seed layer.

53. A method of making a magnetic head assembly as claimed in claim 52 wherein the forming of CoFeNbHf is $Co_{80-90}Fe_{1-5}Nb_{5-11}Hf_{1-5}$.

* * * * *